(12) United States Patent
Hashimoto

(10) Patent No.: US 9,164,319 B2
(45) Date of Patent: Oct. 20, 2015

(54) SURFACE LIGHT-EMITTING DEVICE

(71) Applicant: NLT Technologies, Ltd., Kanagawa (JP)

(72) Inventor: Yukinori Hashimoto, Kanagawa (JP)

(73) Assignee: NLT TECHNOLOGIES, LTD., Kanagawa (JP)

( * ) Notice: Subject to any disclaimer, the term of this patent is extended or adjusted under 35 U.S.C. 154(b) by 98 days.

(21) Appl. No.: 14/048,491

(22) Filed: Oct. 8, 2013

(65) Prior Publication Data
US 2014/0098323 A1  Apr. 10, 2014

(30) Foreign Application Priority Data
Oct. 10, 2012 (JP) .................. 2012-224829

(51) Int. Cl.
*G02F 1/1335* (2006.01)
*G02F 1/1333* (2006.01)

(52) U.S. Cl.
CPC .... *G02F 1/133608* (2013.01); *G02F 1/133308* (2013.01); *G02F 2001/13332* (2013.01); *G02F 2001/133314* (2013.01); *G02F 2001/133317* (2013.01); *G02F 2001/133628* (2013.01); *G02F 2201/506* (2013.01)

(58) Field of Classification Search
CPC ................................ G02F 1/133608
USPC .......................................... 349/58
See application file for complete search history.

(56) References Cited

U.S. PATENT DOCUMENTS

2009/0268122 A1* 10/2009 Takahashi ............ 349/58
2012/0236207 A1*  9/2012 Fukuda ............... 348/725

FOREIGN PATENT DOCUMENTS

| JP | 2003-029262 | 1/2003 |
| JP | 2007-311327 | 11/2007 |
| JP | 2011-108366 | 6/2011 |

\* cited by examiner

*Primary Examiner* — Thanh-Nhan P Nguyen
(74) *Attorney, Agent, or Firm* — Young & Thompson

(57) ABSTRACT

A surface light-emitting device includes: a light guide plate including a notch; a reflection sheet including a notch; a point light source; a light-source substrate; a first chassis covering and extending along the light-source substrate and the lower surface of the light guide plate; a second chassis formed to fit with the first chassis; a liquid crystal panel put on the second chassis; and a third chassis covering the liquid crystal panel and a part of the first chassis on which the light-source substrate is put, and formed to fit with the first chassis on the part. The light-source substrate is fixed on the first chassis. The first chassis includes a protrusion to be engaged with the notches so as to be moved together with the light guide plate and the reflection sheet in response to a movement of the first chassis along the light guide plate.

10 Claims, 11 Drawing Sheets

FIG. 14A
FIG. 14B  FIG. 14C  FIG. 14D
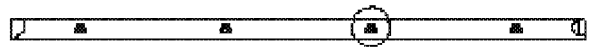
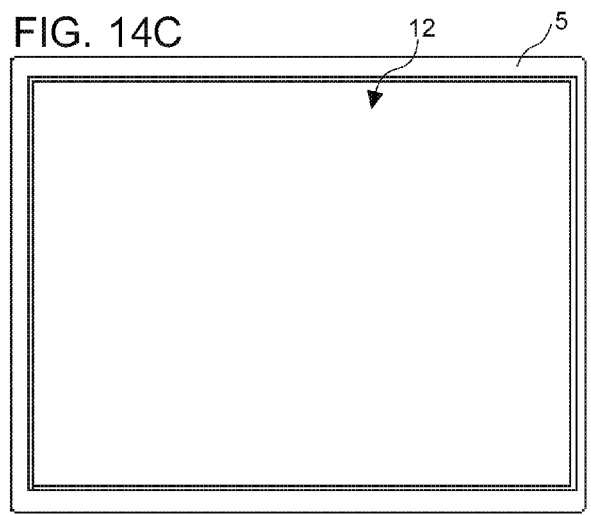
FIG. 14E
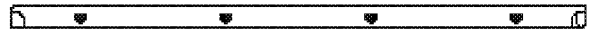
FIG. 14F
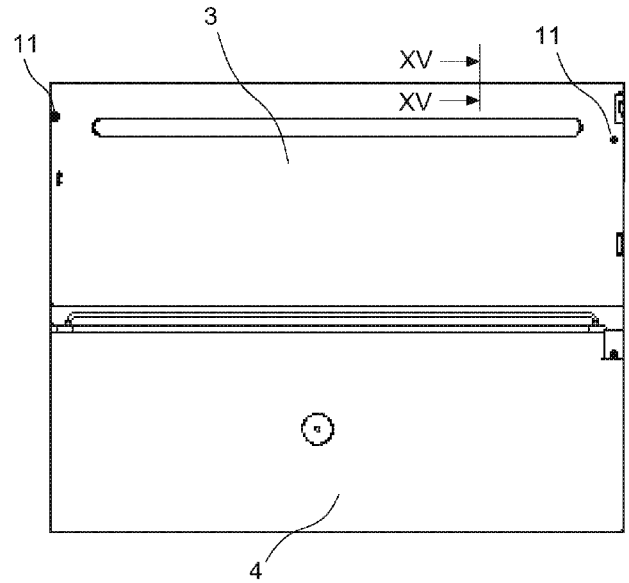

SURFACE LIGHT-EMITTING DEVICE

CROSS REFERENCE TO RELATED APPLICATIONS

This application is based on Japanese Patent Applications No. 2012-224829 filed on Oct. 10, 2012, in the Japan Patent Office, the entire content of which is hereby incorporated by reference.

TECHNICAL FIELD

The present invention relates to a surface light-emitting device, and especially relates to a surface light-emitting device of side light type.

BACKGROUND

Liquid crystal display apparatuses employ, as their light source such as a backlight unit, a surface light-emitting device which uses light coming from one or more light emitting diodes (LEDs) as a point light source and emits two-dimensionally-distributed light. Such a surface light-emitting device has a structure that there is provided a light guide plate with opposing main surfaces (upper surface and lower surface), light coming from one or more light emitting diodes enters one edge surface of the light guide plate, and the light outgoes out from one of the main surfaces (upper surface) of the light guide plate.

As a technology relating to the surface light-emitting device, Japanese Unexamined Patent Application Publication (JP-A) No. 2003-029262 discloses a surface light-emitting device having the following structure. In the structure, a protrusion is formed on a lower chassis (made of metal), and there is provided a notch on each of a reflection sheet and a light guide plate so as to be fitted with the protrusion. The reflection sheet and the light guide plate are mounted on the lower chassis in this order, and then, a light source is mounted on the lower chassis to be covered with the reflection sheet.

As for a surface light-emitting device of side light type using point light sources as its light source, JP-A 2007-311327 discloses a surface light-emitting device having the following structure. In the structure, point light sources are attached on a light-source substrate, the light-source substrate is fixed on an L-shaped substrate-fixing member with adhesive, and the L-shaped substrate-fixing member is fixed on a lower chassis with a screw. In this surface light-emitting device, when the screw is removed, the light-source substrate and the substrate-fixing member can be detached from the surface light-emitting device by being pulled out through the lower surface of the surface light-emitting device.

Further, JP-A No. 2011-108366 discloses a surface light-emitting device having the following structure. In the structure, point light sources are attached on a light-source substrate, the light-source substrate is fixed to a lower chassis by being pressed by a light guide plate toward the lower chassis, and the light guide plate is fixed to an inner chassis with a light-guide-fixing member. In this surface light-emitting device, when the light-guide-fixing member is removed, the light guide plate becomes movable and the light-source substrate can be taken out through an opening formed on a side surface of the surface light-emitting device.

In order to increase the display-screen brightness of the above-described surface light-emitting devices, it is required to increase the number of light emitting elements for increasing the density of the elements, or to increase the current to be supplied to each of the point light sources for enlarging the light fluxes emitted from the light sources. However, the both methods make the temperature around the point light sources high because of heat generated when the point light sources emit light, which results in a decrease in the light fluxes emitted from the point light sources and a decrease in the life of the point light sources, and further results in a decrease in the brightness and reliability of the surface light-emitting device.

In view of this matter, there have been proposed various methods to enhance the heat radiation of the devices. However, those methods provide various problems. For example, a device using such a method does not have a structure that light sources can be replaced easily. As another example, a greater space is required between a light guide plate and point light sources in order to make the replacement of light sources easier, which results in deterioration of the brightness. As another example, the thickness of the surface light-emitting device increases in order to make the replacement of light sources easier. Further, because the point light sources emit light in various directions at light-emitting angles from 0° to 180°, an increase of a space between the light guide plate and the point light sources enlarges the amount of light which does not enter the light guide plate but enters there after the light has been reflected by members located above or below the light guide plate. Therefore, such a structure can make a problem that a loss of reflection light is caused and the loss results in reduced brightness of the device.

For example, the surface light-emitting device disclosed in JP-A No. 2003-029262 has an advantage in heat radiation because the light source is directly attached to the lower chassis, but the replacement of the light sources is difficult because the light source is covered with a reflection sheet.

Further, problems which can be caused in JP-A Nos. 2007-311327 and 2011-108366 are described with reference to FIGS. 16A, 16B and 17A to 17D below. FIGS. 16A and 16B are a perspective view and a sectional view illustrating a structure of a conventional surface light-emitting device disclosed in JP-A No. 2007-311327. FIGS. 16A and 16B illustrate upper chassis 102, lower chassis 103, second lower chassis 104, point light sources 106, light-source substrate 107, light guide plate 108, reflection sheet 109, optical sheet 110 and screw 111. FIGS. 17A to 17D are a front view, a side view, a sectional view taken along the XVIIA-XVIIA line and a sectional view taken along the XVIIB-XVIIB line, illustrating a structure of a conventional surface light-emitting device disclosed in JP-A No. 2011-108366. FIGS. 17A to 17D illustrate lower chassis 103, inner chassis 105, point light sources 106, light-source substrate 107, light guide plate 108, reflection sheet 109, optical sheet 110, screws 111, light-emitting aperture 112, light-guide-plate-fixing member 113, and light-source-substrate-ejecting hole 114.

The surface light-emitting device disclosed in JP-A No. 2007-311327 has an advantage in heat radiation of point light sources 106 because light-source substrate 107 is directly attached to lower chassis 103 as shown in FIGS. 16A and 16B, but upper chassis 102 or lower chassis 103 can be deformed when light-source substrate 107 and upper chassis 102 which have fitted together are being separated, which makes deterioration of the workability. Further, the fitted members can be separated by moving the lower chassis 103, but the increased space between light guide plate 108 and point light sources is required, which results in deterioration of the brightness. The surface light-emitting device disclosed in JP-A No. 2011-108366 has an advantage in heat radiation of point light sources 106 because light-source substrate 107 is directly attached to lower chassis 103 and has an advantage in workability because light-source substrate 107 can be taken out through the hole of the side surface of surface light-emitting device 101 only by detaching light-guide-plate-fixing member 113 as shown in FIGS. 17A to 17D, but such a device has the structure that light-source substrate 107 is fixed by being pressed (in the direction of the arrow of FIG. 17D) with light guide plate 108, and requires a surface extending in the thickness direction of the device so as to make light-source substrate 107 and light guide plate 108 touch to each other on the surface. Therefore, it is difficult to decrease the thickness of the surface light-emitting device 101.

Consequently, there have been provided surface light-emitting devices not to satisfy all of the desired properties: an excellent workability, high brightness, long life, and reduced thickness.

The present invention seeks to solve the problem.

SUMMARY

There are disclosed illustrative surface light-emitting devices, as embodiments of the present invention.

A surface light-emitting device as one of illustrative embodiments of the present invention comprises a light guide plate for emitting two-dimensionally-distributed light, wherein the light guide plate includes an upper surface and a lower surface facing each other and further includes a notch. The surface light-emitting device further comprises: a reflection sheet arranged on the lower surface of the light guide plate and including a notch; a point light source for emitting light, arranged so as to make the light enter an edge surface of the light guide plate; and a light-source substrate including surfaces facing each other, where the point light source is arranged on one of the surfaces. The surface light-emitting device further comprises: a first chassis covering and extending along the other of the surfaces of the light-source substrate and the lower surface of the light guide plate, wherein the light-source substrate is fixed on the first chassis. The first chassis includes a protrusion projecting toward the lower surface of the light guide plate to be engaged with the notch of the light guide plate and the notch of the reflection sheet such that the light guide plate and the reflection sheet are pushed by the protrusion and are moved together with the first chassis in response to a movement of the first chassis along the lower surface of the light guide plate. The surface light-emitting device further comprises: a second chassis including a light-emitting aperture for passing through the two-dimensionally-distributed light, and being formed to fit with the first chassis; a liquid crystal panel put on the second chassis; and a third chassis including a light-emitting aperture for passing through the two-dimensionally-distributed light. The third chassis covers the liquid crystal panel and a part of the first chassis on which the light-source substrate is put, wherein the part of the first chassis is formed to fit with a part of the third chassis covering the part of the first chassis.

A surface light-emitting device as another of illustrative embodiments of the present invention comprises a light guide plate for emitting two-dimensionally-distributed light, wherein the light guide plate includes an upper surface and a lower surface facing each other and further includes a notch. The surface light-emitting device further comprises: a reflection sheet arranged on the lower surface of the light guide plate and including a notch; a point light source for emitting light, arranged so as to make the light enter an edge surface of the light guide plate; and a light-source substrate including surfaces facing each other, wherein the point light source is arranged on one of the surfaces. The surface light-emitting device further comprises: a first chassis covering and extending along the other of the surfaces of the light-source substrate and the lower surface of the light guide plate, wherein the light-source substrate is fixed on the first chassis. The first chassis includes a protrusion projecting toward the lower surface of the light guide plate to be engaged with the notch of the light guide plate and the notch of the reflection sheet such that the light guide plate and the reflection sheet are pushed by the protrusion and are moved together with the first chassis in response to a movement of the first chassis along the lower surface of the light guide plate. The surface light-emitting device further comprises: a second chassis including a light-emitting aperture for passing through the two-dimensionally-distributed light. The second chassis covers a part of the first chassis on which the light-source substrate is put, where the part of the first chassis is formed to fit with a part of the second chassis covering the part of the first chassis. The surface light-emitting device further comprises: a liquid crystal panel put on the second chassis.

Other features of illustrative embodiments will be described below.

BRIEF DESCRIPTION OF THE DRAWINGS

Embodiments will now be described, by way of example only, with reference to the accompanying drawings which are meant to be exemplary, not limiting, and wherein like elements numbered alike in several figures, in which:

FIGS. 14A to 14F are plan views illustrating an external appearance of a surface light-emitting device of side-light type of Example 4;

DETAILED DESCRIPTION

Figure 1A:
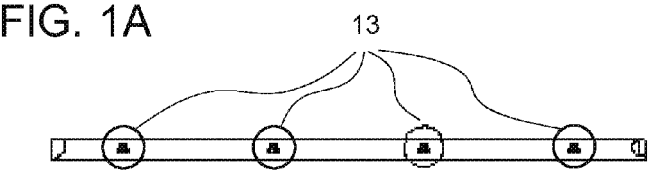
FIGS. 1A to 1G are plan views illustrating an external appearance of a surface light-emitting device of side-light type of Example 1, and an enlarged perspective view illustrating a part of the surface light-emitting device.
Figure 1B:

Illustrative embodiments of surface light-emitting devices will be described below with reference to the drawings. It will be appreciated by those of ordinary skill in the art that the description given herein with respect to those figures is for exemplary purposes only and is not intended in any way to limit the scope of potential embodiments may be resolved by referring to the appended claims.

As illustrated in the description about the background, when, in order to increase the brightness of a display screen in an surface light-emitting device, the number of light emitting elements is increased for increasing the density of the elements or the current to be supplied to each of the point light sources is increased for enlarging the light fluxes emitted by the point light sources, the temperature around the point light sources increases because of heat generated by the point light sources. Thereby, the light fluxes emitted by the point light sources are decreased and the life of the light sources becomes shorter, which makes deterioration of the brightness and reliability of the surface light-emitting device. In view of the problem, connecting a light-source substrate to the lower chassis enhances the heat radiation and the life of the point light sources, but makes the replacement of the point light sources difficult. Further, the structure that the light-source substrate can be replaced increases the space between the light guide plate and the point light sources and causes a problem that the brightness deteriorates or the thickness of the surface light-emitting device increases.

In view of the problem, there is provided a surface light-emitting device as an embodiment of the present invention, having the following structure. In the structure, the light-source substrate is put on a lower chassis in order to enhance the heat radiation. The structure allows the light-source substrate to be replaced together with the lower chassis. Further, in the structure, the lower chassis is connected to an inner chassis with a screw and to an upper chassis with a fitting claw. Thereby, when the screw is removed, the lower chassis becomes movable toward the inside of the surface light-emitting device (toward the light guide plate). Then, when the lower chassis is moved toward the inside of the surface light-emitting device, the lower chassis is came out from the upper chassis which has been fitted together with the lower chassis, and the lower chassis can be detached from the surface light-emitting device easily.

In this embodiment, a protrusion is formed on the lower chassis, a notch is formed on each of the light guide plate and a reflection sheet formed on the light guide plate, and the protrusion and the notches are engaged together. Thereby, the light guide plate slides in accordance with a slide of the lower chassis (in other words, the point light source and the light guide plate move together). In the structure, there is no need to increase the space between the point light source and the light guide plate and the space is minimized in length, which makes the light loss the smallest and realizes the high brightness. Further, because the light guide plate and the lower chassis are engaged together and the light guide plate is not required to be pressed to the light-source substrate with a element such as the light-guide-plate-fixing member as conventionally performed, there is no need to form an area for holding the point light source in the light guide plate and the reduced thickness of the surface light-emitting device can be realized.

Example 1

A surface light-emitting device of Example 1 will be described below with referring to FIGS. 1A to 1G and FIG. 2, to illustrate the above-described embodiments further more in detail.

Figure 1C:
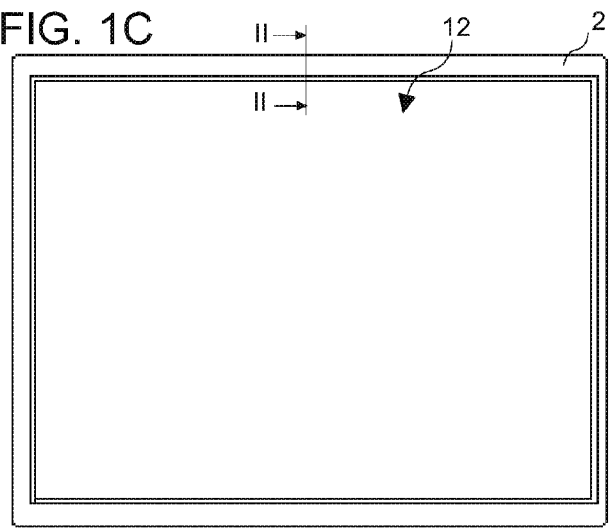
Figure 1D:
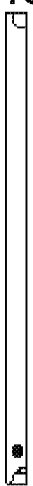
Figure 1E:
Figure 1F:
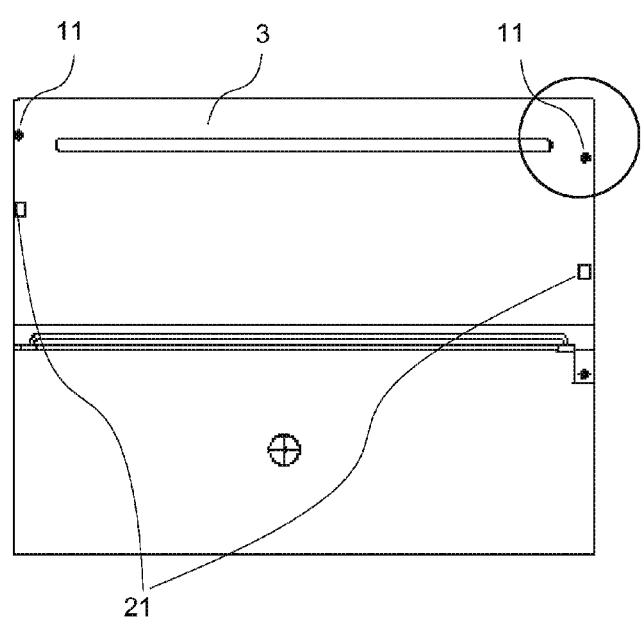
Figure 1G:
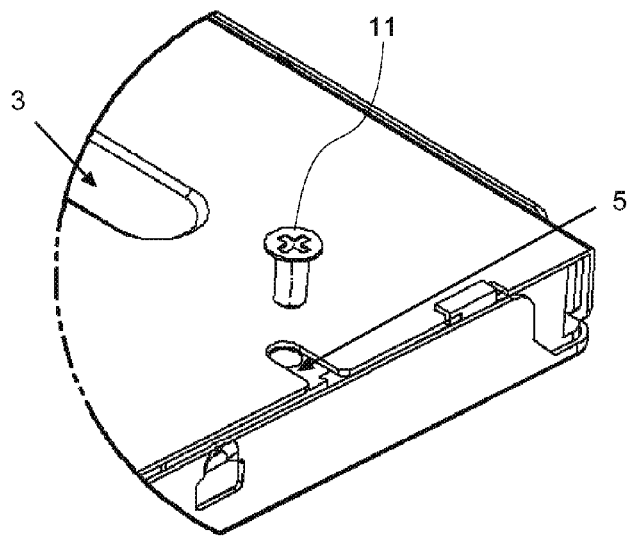

FIGS. 1A to 1F are plan views illustrating an external appearance of a surface light-emitting device of side-light type of the present example, and FIG. 1G is a perspective view illustrating an area around screw 11 of the surface light-emitting device. Surface light-emitting device 1 includes upper chassis 2 arranged at the side of the liquid crystal panel (at the upper-surface side), lower chassis 3 arranged at the rear-surface side, and inner chassis 5 put between the upper chassis and lower chassis. The upper chassis 2 and lower chassis 3 are fixed together by using fitting structures (upper-and-lower-chassis-fitting sections 13), and lower chassis 3 and inner chassis 5 are fixed together with a fitting structure (screws 11). Each of upper chassis 2 and inner chassis 5 includes light-emitting aperture 12 for passing through two-dimensionally-distributed light, at the position facing the liquid crystal panel thereon.

Figure 2:
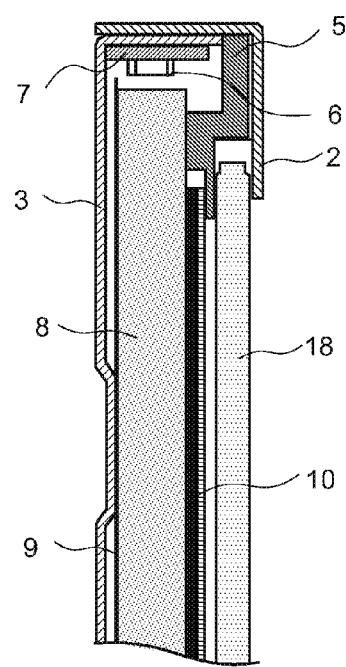
FIG. 2 is a sectional view taken along the line II-II of FIG. 1C.

FIG. 2 is a sectional view taken along the line II-II of FIG. 1C. Inner chassis 5 is held with upper chassis 2 and lower chassis 3 put on both sides thereof. Point light source 6 is put on light-source substrate 7, and light-source substrate 7 is fixed to lower chassis 3 with pieces of both-sided adhesive tape. Though light-source substrate 7 is attached on the side surface of the lower chassis 3 in FIG. 2, the light-source substrate may be attached at another place on the lower chassis as far as point light source 6 is arranged so as to make the light enter an edge surface of light guide plate 8 which will be described later, and for example, the light source substrate may be attached on the bottom surface of the lower chassis 3. As for point light source 6, one or more light-emitting elements such as light emitting diodes are used. Those light emitting elements are directly connected to the light-source substrate 7 or are connected to the light-source substrate 7 with being embedded in a package formed of material such as resin and ceramic.

Light guide plate 8 is arranged with facing point light source 6 at a distance which is as short as about 0.3 mm. Light guide plate 8 includes an upper surface and a lower surface facing each other. On the light-emitting-aperture side (the upper-surface side) of light guide plate 8, there are arranged optical sheet 10 and liquid crystal panel 18 in order from a position closer to light guide plate 8. On the other side (the lower-surface side) of light guide plate 8, there is arranged reflection sheet 9. Light guide plate 8, reflection sheet 9 and optical sheet 10 are held with inner chassis 5 and lower chassis 3 (a convex part located at a short distance inside from the edge of the lower chassis) arranged at the both sides of the components. Liquid crystal panel 18 is put on inner chassis 5 and is held with inner chassis 5 and upper chassis 2 arranged at the both sides thereof. In the present example, light guide plate 8 and reflection sheet 9 are provided as separated bodies, but light guide plate 8 and reflection sheet 9 may be integrally formed in one body. Lower chassis 3 covers the rear surface of light-source substrate 7 and the lower surface of light guide plate 8 so as to extend along (almost parallel with) the rear surface of light-source substrate 7 and the lower surface of light guide plate 8. Upper chassis 2 covers liquid crystal panel 18 and a part of lower chassis 3 on which light-source substrate 7 is put, where the part of lower chassis 3 is formed to fit with a part of upper chassis 2 covering the part of lower chassis 3.

Figure 3:
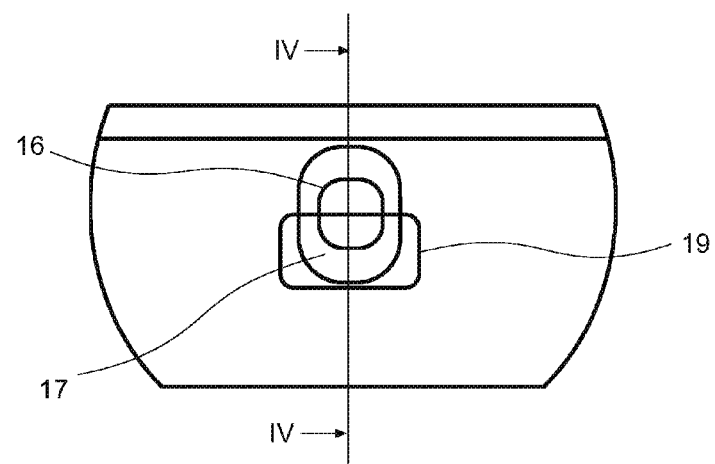
FIG. 3 is an enlarged view illustrating a fitting section of the upper chassis and lower chassis.
Figure 4:
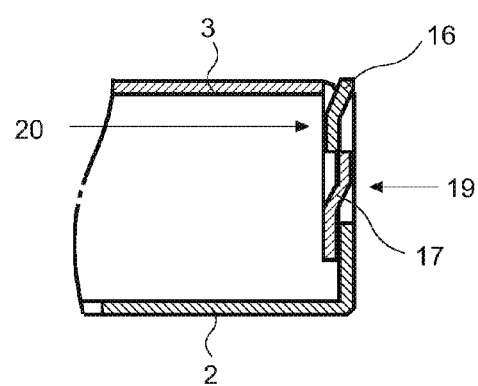
FIG. 4 is a sectional view taken along the line IV-IV of FIG. 3.

FIG. 3 illustrates a fitting structure (upper-and-lower-chassis-fitting structure 13) of upper chassis 2 and lower chassis 3. Upper chassis 2 and lower chassis 3 are fixed together by fitting upper-chassis-fitting claw 16 and lower-chassis-fitting claw 17 to each other. FIG. 4 is an enlarged view taken along the line IV-IV of FIG. 3. Upper-chassis-fitting claw 16 is depressed inside the surface light-emitting device 1 by about 0.5 mm in depth. Lower-chassis-fitting claw 17 protrudes outside the surface light-emitting device 1 by about 0.5 mm in height. Lower-chassis-fitting hole 20 is formed in lower chassis 3, at a position facing the upper-chassis-fitting claw 16. Upper-chassis-fitting hole 19 is formed in upper chassis 2, at a position facing the lower-chassis-fitting claw 17.

Figure 5:
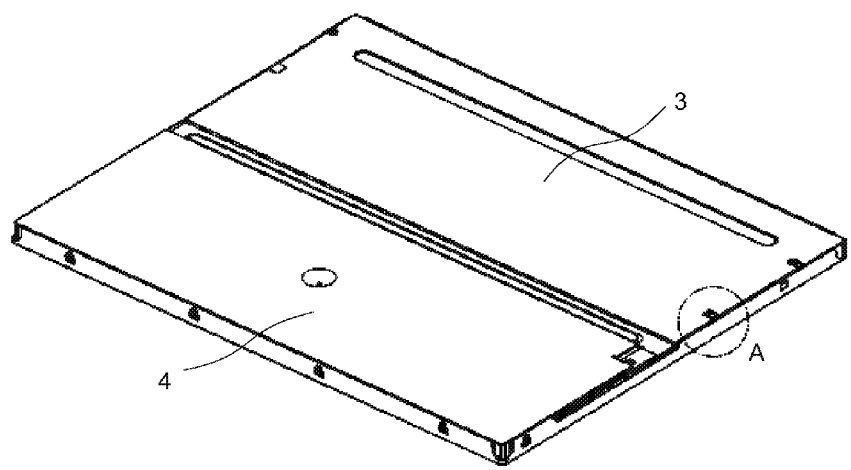
FIG. 5 is a perspective view illustrating an external appearance of the rear surface of the surface light-emitting device of side-light type of Example 1.

FIG. 5 is a perspective view illustrating surface light-emitting device 1 viewed from the rear-surface side. Second lower chassis 4 is attached on an area below the bottom of lower chassis 3 and is arranged such that lower chassis 3 comes in contact with second lower chassis 4 when lower chassis 3 is detached from the device.

Figure 6:
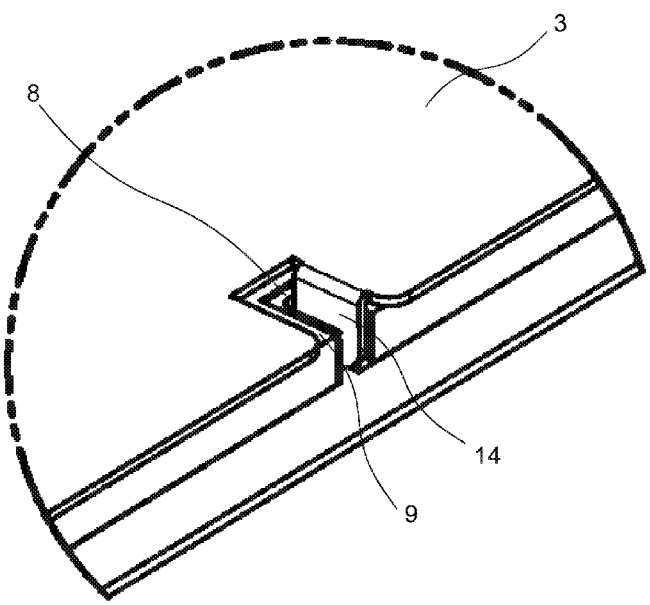
FIG. 6 is an enlarged view illustrating an engaging structure of a protrusion of a lower chassis, a light guide plate and a reflection sheet, in the area A of FIG. 5.

FIG. 6 is an enlarged view of the area A of FIG. 5. Lower chassis 3 includes at least one lower-chassis protrusion (preferably a pair of protrusions) 14 projecting toward light guide plate 8 (toward the lower surface of light guide plate 8). On each of light guide plate 8 and reflection sheet 9, there is provided at least one notch formed to be fitted with lower-chassis protrusion 14 and have a clearance of about 0.1 mm so as not to touch with lower-chassis protrusion 14. In the case that the lower-chassis protrusion 14 is formed by bending a part of lower chassis 3, a hole appears around lower-chassis protrusion 14. Therefore, the hole is sealed with a piece of tape 21 (see FIG. 1F) to be protected from contamination. Fitting the lower-chassis protrusion 14 and notches of light guide plate 8 and reflection sheet 9 together, provides the structure such that light guide plate 8 and reflection sheet 9 are pushed by lower-chassis protrusion 14 and are moved together with lower chassis 3 in response to the movement of lower chassis 3 along (almost parallel with) the lower surface of light guide plate 8.

Though each of upper chassis 2, lower chassis 3 and inner chassis 5 may be made of any one of a resin material and a metal material, lower chassis 3 and upper chassis 2 (especially the lower chassis 3) are preferably made of a metal material such as aluminum from a viewpoint of heat radiation. Though material of light-source substrate 7 may be made of any one of a resin material such as glass fiber reinforced epoxy resin and a metal material such as aluminum and copper, material of light-source substrate 7 is preferably made of a metal material such as aluminum from a viewpoint of heat radiation.

Light guide plate 8 may be made of a transparent material such as acrylic resin and polycarbonate resin, and light scattering agent may be mixed into the transparent material. Further, on surfaces of the light guide plate 8 to which reflection sheet 9 and optical sheet 10 touch, a treatment such as dot-printing, matte-finishing by blasting, dot-shape finishing, grooving, lens-shape finishing, and mirror-like finishing is performed so that light which has emitted from point light source 6 and entered the edge surface of light guide plate 8 goes outside through light-emitting aperture 12 with being distributed uniformly.

Next, the way to replace point light source 6 (light-source substrate 7) in surface light-emitting device 1 having the above structure will be described.

Figure 7:
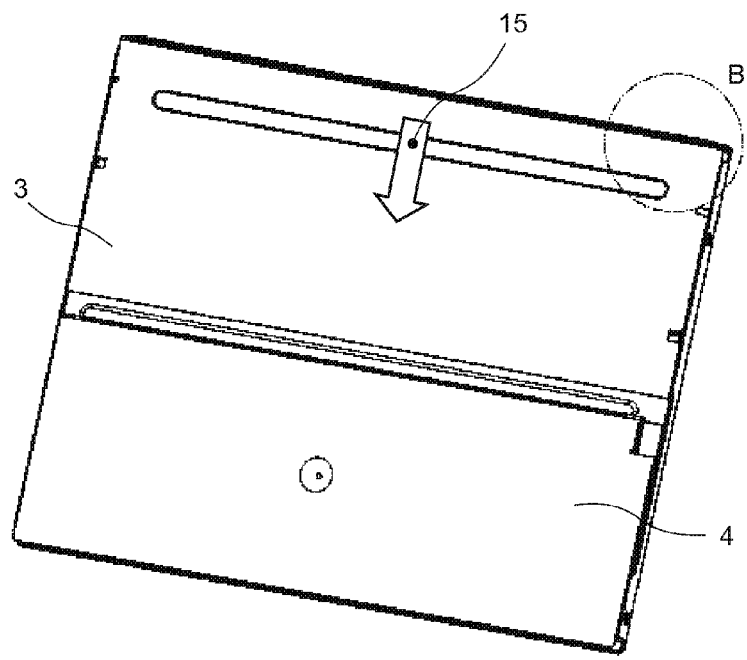
FIG. 7 is a perspective view illustrating a condition that the lower chassis moves toward a second lower chassis.

In the structure, since point light source 6 and light-source substrate 7 are fixed on lower chassis 3, the replacement of point light source 6 is realized by removing lower chassis 3. Concretely, after two screws 11 in FIG. 1F are removed from the device, lower chassis 3 is moved in the moving direction 15 of the lower chassis (the direction of the arrow in FIG. 7, in other words, along the lower surface of the light guide plate) until the lower chassis touches with second lower chassis 4 as shown in FIG. 7, where the movement amount of the lower chassis is about 1 mm. When lower chassis 3 moves, lower-chassis protrusion 14 pushes notch sections of light guide plate 8 and reflection sheet 9. Therefore, lower chassis 3, light guide plate 8 and reflection sheet 9 move together. In this structure, since the clearance between point light source 6 and light guide plate 8 is greater than the clearance between lower-chassis protrusion 14 and a notch section of light guide plate 8, point light source 6 does not touch with light guide plate 8 in the movement, which prevents damage of point light source 6 before it causes.

Figure 8:
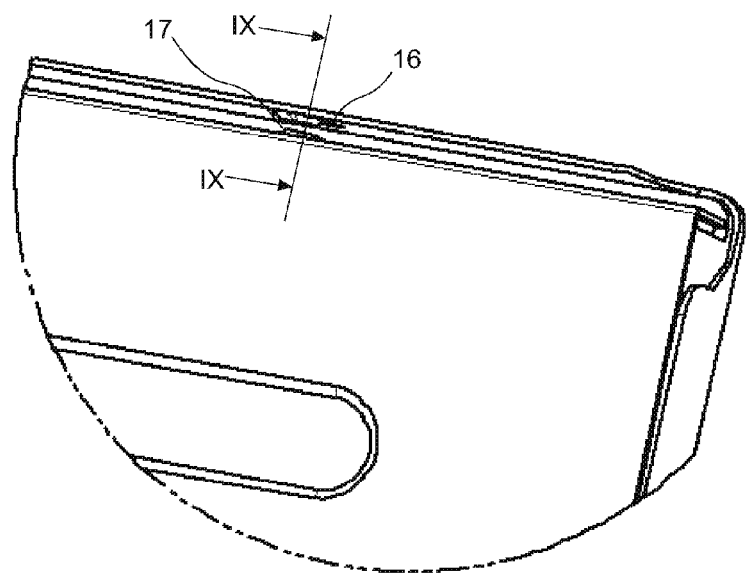
FIG. 8 is an enlarged view illustrating a condition that the lower chassis and the upper chassis which have been fitted together are separated in the area B of FIG. 7.
Figure 9:
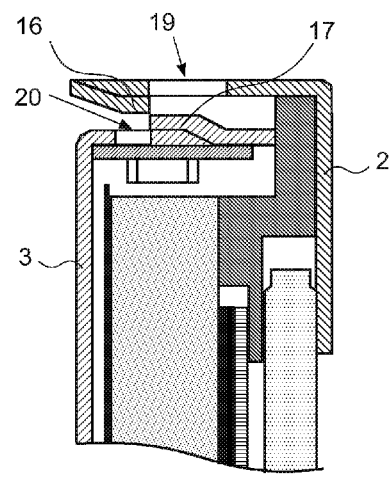
FIG. 9 is a sectional view taken along the line IX-IX of FIG. 8.

When the structure comes to be in the condition, as shown in FIG. 8 and FIG. 9, which is the enlarged view of the cross section taken along the line IX-IX of FIG. 8, upper-chassis fitting claw 16 comes out from lower-chassis-fitting hole 20, lower-chassis-fitting claw 17 comes out from upper-chassis-fitting hole 19, and then, upper-chassis-fitting claw 16 and lower-chassis-fitting claw 17 are released, which means that all the fitting structures of lower chassis 3 are released.

Figure 10:
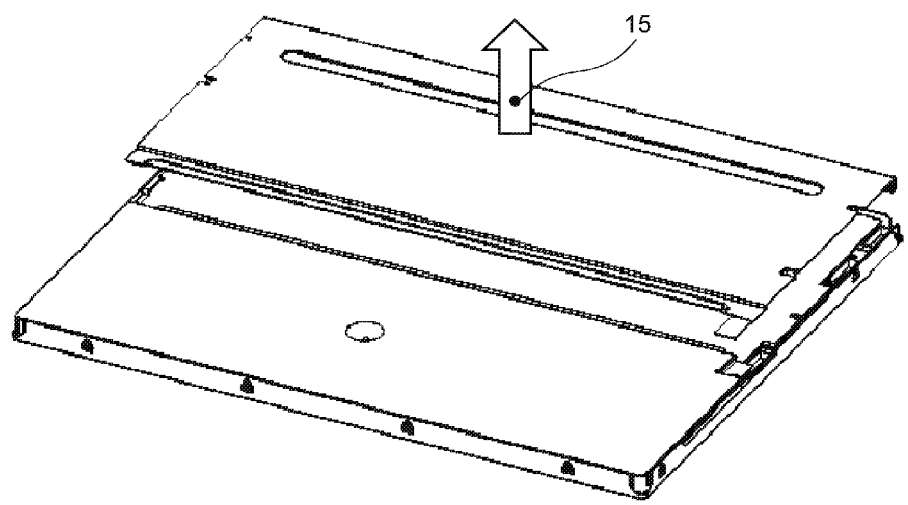
FIG. 10 is a perspective view illustrating a condition that the lower chassis is detached from the rear surface of the surface light-emitting device.

Next, as shown in FIG. 10, when lower chassis 3 is moved in the moving direction 15 of the lower chassis (the direction of the arrow in FIG. 10, in other words, in the direction away from the lower surface of the light guide plate), lower chassis 3 can be detached from surface light-emitting device 1 and point light source 6 and light-source substrate 7 fixed on lower chassis 3 can be replaced.

Next, effects of surface light-emitting device 1 of the present example will be described.

Light emitting diodes as light emitting elements of point light source 6 emit heat and light when electricity flows through the light emitting diodes. Light emitting diodes have a nature that the light-emitting efficiency and light-emitting time deteriorate under the condition that the temperature of the elements becomes excessively high. Therefore, a structure with an excellent heat radiation is required in order not to increase the temperature of light emitting elements even when the density of the light emitting elements increases or a heavy current passes through the light emitting elements. When the structure employs, as the way to perform heat radiation, heat radiation to the atmosphere rather than cooling with refrigerant material and ebullient cooling, it is required that sufficient size of an area for heat radiation in accordance with the heat amount of heat is secured and that heat is transferred from the heat source to the heat-radiation area rapidly.

In this example, light-source substrate 7 is formed of metal which is advantageous in heat radiation, and heat generated by light emitting elements moves to the rear surface of light-source substrate 7 rapidly. The heat further moves to lower chassis 3 which is tightly connected to the rear surface of light-source substrate 7, and is radiated from the rear surface of lower chassis 3 to the atmosphere. Lower chassis 3 is also formed of metal which is advantageous in heat radiation and is located at the rear side of surface light-emitting device. Therefore, lower chassis 3 can secure a wider heat-radiation area and has an excellent property of heat radiation. Accordingly, the temperature of the light emitting elements do not become excessively high, which results in a high light-emitting efficiency and a long light-emitting time and realizes surface light-emitting device 1 with high brightness and high reliability.

At the same time, only by the operation to remove screws 11 which have been put on the rear surface of surface light-emitting device and to separate lower chassis 3 and upper chassis 2 which have been fitted together, light-source substrate 7 can be replaced easily. Further, since light-guide plate 8 (and reflection sheet 9) and lower chassis 3 move together, the required space between point light source 6 and light guide plate 8 is equivalent to just the moving amount of the lower chassis 3 required in order to separate the fitted lower chassis 3 and upper chassis 2, which does not decrease the brightness of the device. Further, since light guide plate 8 does not support light-source substrate 7, the thickness of light guide plate 8 can be set to the same level or low as the size of point light source 6, which realizes the decreased thickness of surface light-emitting device 1.

Example 2

Figure 11A:
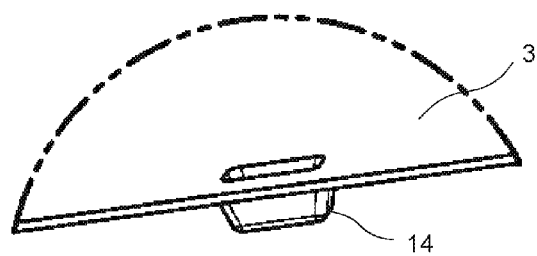
FIGS. 11A to 11C are perspective views partially illustrating structures of the surface light-emitting device of side-light type of Example 2, and are views illustrating a form of the protrusion of the lower chassis, the form of the light-guide-plate hole (hollow), and the form of the light-guide-plate hole (notch), respectively.

Next, surface light-emitting device of Example 2 will be described with reference to FIGS. 11A to 11C. The present example illustrates one of variations of the fitting structure of lower chassis 3, light guide plate 8 and reflection sheet 9. Components of the present example other than the fitting structure are the same as those of Example 1 and are omitted in the following descriptions.

Example 1 has provided a structure that lower-chassis protrusion 14 was formed by an L-shaped bent part. In the present example, as shown in FIG. 11A, lower-chassis protrusion 14 formed by embossing. The embossed structure does not form a hole which was formed on lower chassis 3 in the above example of the L-shaped bent part, and the piece of tape 21 for protecting the hole from contamination can be omitted.

Figure 11B:
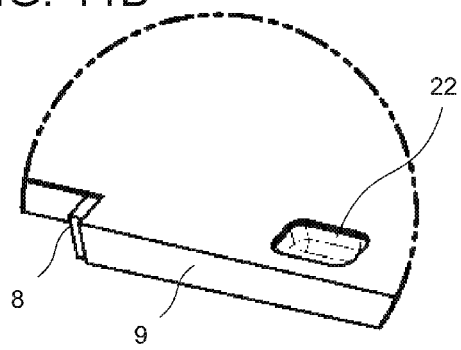
Figure 11C:
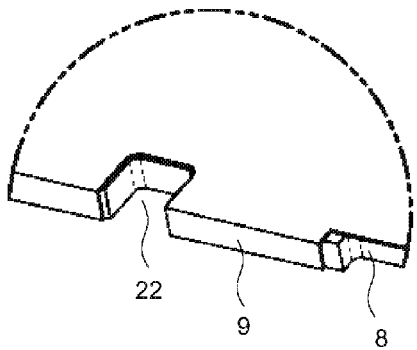

The present example further has the following structure shown in FIGS. 11B and 11C. There is provided light-guide-plate hole 22 (light-guide-plate hole 22 in a hollow shape as shown in FIG. 11B or light-guide-plate hole 22 in a notch shape as shown in FIG. 11C) on light guide plate 8 so as to fit with the embossed protrusion on lower chassis 3. There is provided a hole or notch on reflection sheet 9. In this structure, lower-chassis protrusion 14, and light-guide-plate hole 22 and a hole or notch of reflection sheet 9 have a clearance of about 0.1 mm similarly to Example 1.

In the above structure, lower-chassis protrusion 14 having an embossed shape is engaged with light-guide-plate hole 22 and a hole or notch formed on reflection sheet 9. Therefore, similarly to Example 1, after screws 11 are removed, lower chassis 3, light guide plate 8 and reflection sheet 9 move in the moving direction 15 of lower chassis in FIG. 7, so that upper chassis 2 and lower chassis 3 which have been fitted together are separated from each other.

As described above, since the structure of the present example provides lower-chassis protrusion 14 having an embossed shape and a hole does not formed on lower chassis 3, pieces of tape 21 can be omitted and surface light-emitting device 1 can be manufactured at the lower cost.

Example 3

Next, surface light-emitting device of Example 3 will be described with reference to FIGS. 12A, 12B and 13. The present example illustrates one of variations of the fitting structure of lower chassis 3 and inner chassis 5. Components of the present example other than the fitting structure are the same as those of Examples 1 and 2 and are omitted in the following descriptions.

Figure 12A:
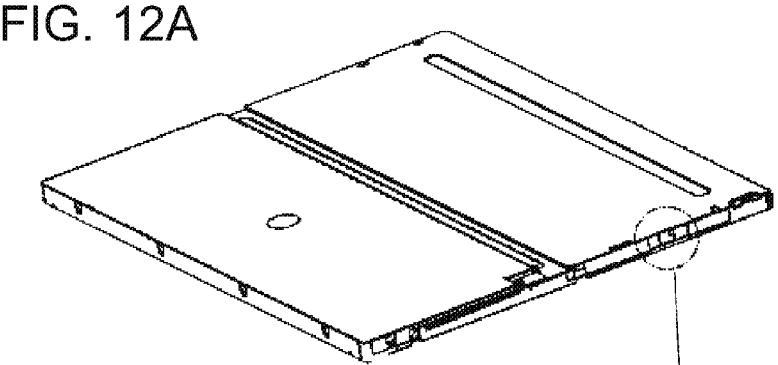
FIGS. 12A and 12B are perspective views illustrating an example of a fitting structure of the lower chassis and the inner chassis of the surface light-emitting device of side-light type of Example 3.
Figure 12B:
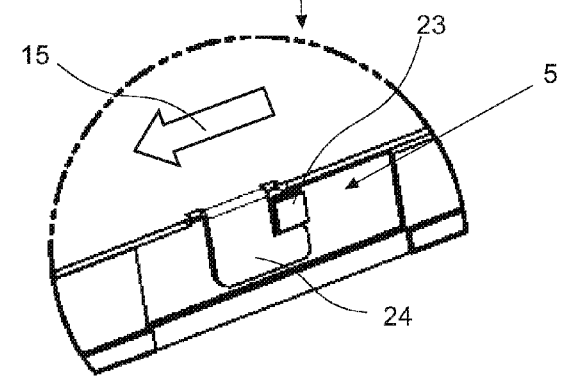

In the present example, there are provided the following components as shown FIGS. 12A and 12B in the structure which is same as those of Examples 1 and 2. Around a surface of inner chassis 5 on which lower chassis 3 slides, there is provided a structure to fit lower chassis 3 and inner chassis 5 together, for example by forming one inner-chassis protrusion 23 having a rectangular shape on inner chassis 5 and one L-shaped lower-chassis claw 24 on lower chassis 3.

The form of inner-chassis protrusion 23 may be in any form such as circle. The form of lower-chassis claw 24 may also be in any form as far as it is engaged with inner-chassis protrusion 23. This engaging structure may be put on the opposing surfaces of inner chassis 5 on which lower chassis 3 slides, or may be put on one of the both ends. The number of the engagement structures to be put on one surface may be arbitrarily selected.

Figure 13:
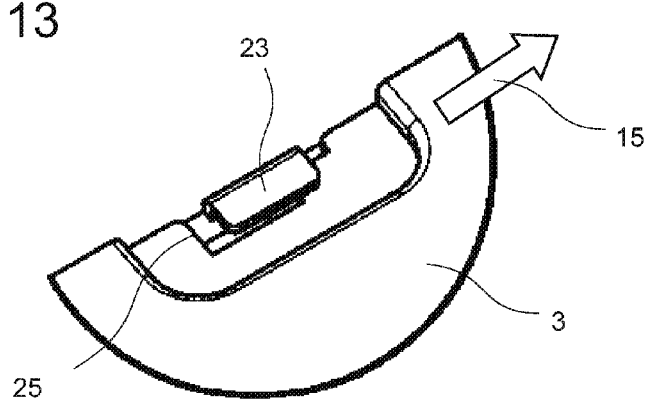
FIG. 13 is a perspective view illustrating another example of a fitting structure of the lower chassis and the inner chassis of the surface light-emitting device of side-light type of Example 3.
Figure 15:
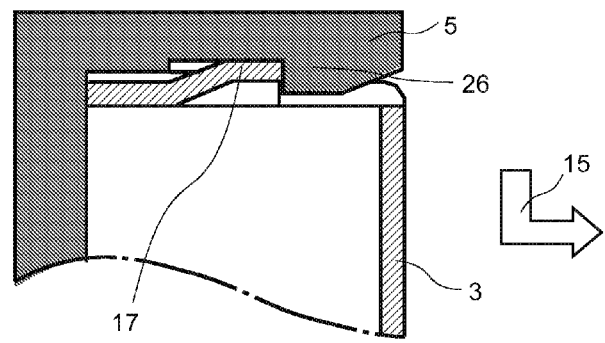
FIG. 15 is a sectional view taken along the line XV-XV of FIG. 14F.
Figure 16A:
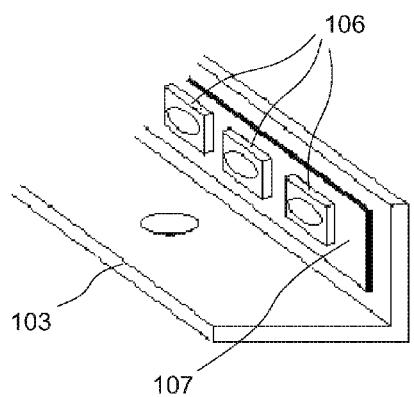
FIGS. 16A and 16B are a perspective view and a sectional view illustrating a structure of a conventional surface light-emitting device (disclosed in JP-A No. 2007-311327)
Figure 16B:
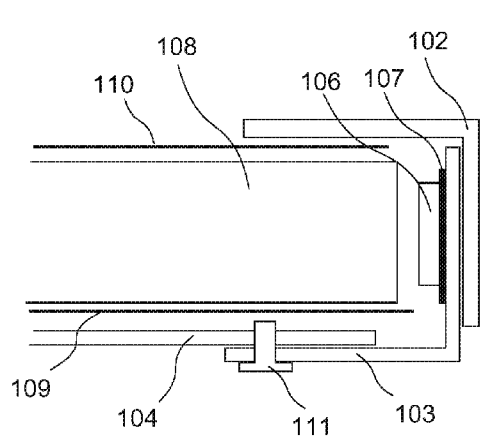
Figure 17A:
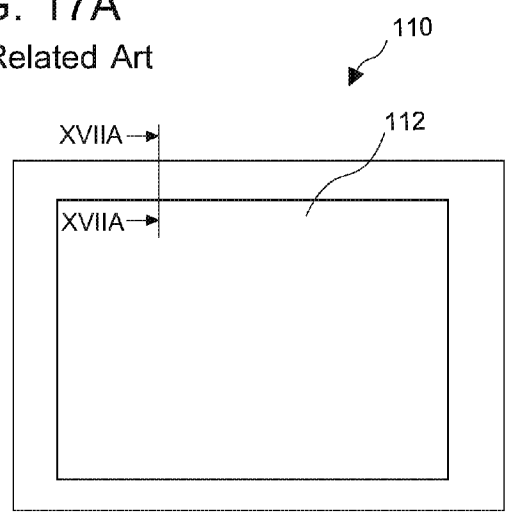
FIGS. 17A to 17D are plan views and sectional views illustrating a structure of a conventional surface light-emitting device (disclosed in JP-A No. 2011-108366).
Figure 17B:
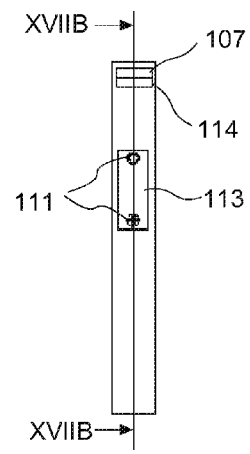
Figure 17C:
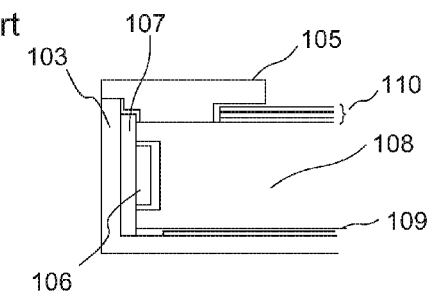
Figure 17D:
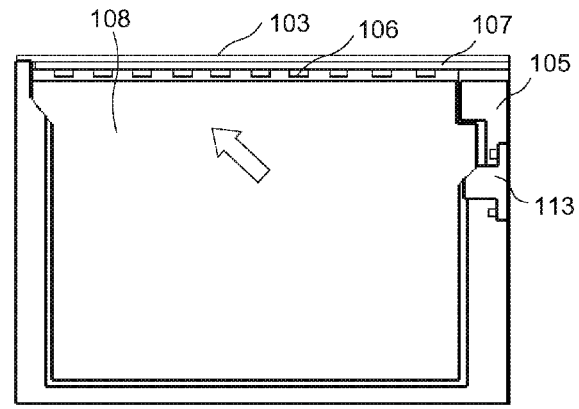

As shown in FIG. 13, there may be provided inner-chassis protrusion 23 on inner chassis 5 and lower-chassis hole 25 on lower chassis 3, so as to hitch inner-chassis protrusion 23 on an area of lower chassis 3 around lower-chassis hole 25 to engage them together. In this example, a step shown in FIG. 13 provided on lower chassis 3 can absorb the thickness of inner-chassis protrusion 23, which prevents the thickness of surface light-emitting device 1 from increasing.

In the structure, it is preferable to make the fitting degree of lower-chassis claw 24 and inner-chassis protrusion 23 in FIGS. 12A and 12B or the fitting degree of lower-chassis hole 25 and inner chassis protrusion 23 in FIG. 13 greater than the fitting degree of lower-chassis fitting claw 17 and upper-chassis fitting claw 16.

In the above structure, when lower chassis 3 moves in the lower-chassis moving direction 15 in FIGS. 12B and 13 (in other words, the direction that the lower chassis slides along the inner chassis), lower-chassis claw 24 and inner-chassis protrusion 23 which have been fitted together or lower-chassis hole 25 and inner-chassis protrusion 23 which have been fitted together are separated. When the fitting degree of lower-chassis claw 24 and inner-chassis protrusion 23 or the fitting degree of lower-chassis hole 25 and inner-chassis protrusion 23 is made to be greater than the fitting degree of lower-chassis fitting claw 17 and upper-chassis fitting claw 16, the fitted lower-chassis fitting claw 17 and upper-chassis fitting claw 16 are also separated from each other on moving the lower chassis 3, lower chassis 3 can be detached from the device easily.

Accordingly, the structure of the present example can restrict a rise of lower chassis 3 in the Z-direction (the direction to be separated away from the bottom surface of light guide plate) to be generated when point light source 6 which has been fixed on lower chassis 3 is removed. Further, when lower-chassis claw 24 and inner-chassis protrusion 23 which has been fitted together or lower-chassis hole 25 and inner-chassis protrusion 23 which have been fitted together are separated from each other, the fitting structure of lower-chassis fitting claw 17 and upper-chassis fitting claw 16 are also separated from each other, which allows a smooth replacement of point light source 6.

Example 4

Next, a surface light-emitting device of Example 4 will be described with reference to FIGS. 14A to 14F and FIG. 15.

The present example provides the following structure shown in FIGS. 14A to 14F and FIG. 15 which is an enlarged view of a cross section taken along the XV-XV line of FIG. 14F. Upper chassis 2 is eliminated from the structures of Examples 1 to 3. Inner-chassis-fitting claw 26 formed on inner chassis 5 and lower-chassis-fitting claw 17 formed on lower chassis 3 are fitted together. Since the structure of the present example does not include upper chassis 2, liquid crystal panel 18 is fixed on inner chassis 5 with pieces of single-sided adhesive tape or double-sided adhesive tape.

In this structure, by removing screws 11 and moving lower chassis 3 in the lower-chassis-moving direction 15, inner-chassis-fitting claw 26 and lower-chassis-fitting claw 17 which have been fitted together are separated, and lower chassis 3 can be detached from the rear surface of surface light-emitting device in short time, which makes the replacement operation of point light source 6 more easier. Further in the above structure, since upper chassis 2 can be omitted, a furthermore reduced thickness and light weight of the surface light-emitting device can be achieved.

While the present embodiments of the present invention have been described using specific terms, such description is for illustrative purpose only, and it is to be understood that changes and variations may be made without departing from the spirit or scope of the appended claims.

For example, the above examples have provided the structure that lower chassis 3 and inner chassis 5 are fixed together with screws 11, but any structure may be employed as far as lower chassis 3 and inner chassis 5 can be fixed together so as not to be separated easily.

Example 3 has provided the structure that lower chassis 3 and inner chassis 5 are fitted together with inner-chassis protrusion 23 and one of lower-chassis claw 24 and lower-chassis hole 25. However, any fitting structure may be provided as far as lower chassis 3 can be held so as not to be separated from the bottom surface of light guide plate 8.

The above examples provided the structure that upper chassis 2 and lower chassis 3 are fitted together by using upper-chassis-fitting claw 16 and lower-chassis-fitting claw 17. However, any fitting structure may be provided as far as upper chassis 2 and lower chassis 3 can be fixed together so as not to be separated easily.

The embodiments of the present invention can be applicable to surface light-emitting devices, especially to surface light-emitting devices of side-light type.

Surface light-emitting device as embodiments of the present invention, can simultaneously provides various effects: properties: an excellent workability about light-source replacement, high brightness, long life, and reduced thickness.

The invention claimed is:

1. A surface light-emitting device comprising:
a light guide plate for emitting two-dimensionally-distributed light, the light guide plate including an upper surface and a lower surface facing each other and further including a notch;
a reflection sheet arranged on the lower surface of the light guide plate and including a notch;
a point light source for emitting light, arranged so as to make the light enter an edge surface of the light guide plate;
a light-source substrate including surfaces facing each other, the point light source being arranged on one of the surfaces;
a first chassis covering and extending along the other of the surfaces of the light-source substrate and the lower surface of the light guide plate, the light-source substrate being fixed on the first chassis, the first chassis including a protrusion projecting toward the lower surface of the light guide plate to be engaged with the notch of the light guide plate and the notch of the reflection sheet such that the light guide plate and the reflection sheet are pushed by the protrusion and are moved together with the first chassis in response to a movement of the first chassis along the lower surface of the light guide plate;
a second chassis including a light-emitting aperture for passing through the two-dimensionally-distributed light, and being formed to fit with the first chassis;
a liquid crystal panel put on the second chassis; and
a third chassis including a light-emitting aperture for passing through the two-dimensionally-distributed light, and covering the liquid crystal panel and a part of the first chassis on which the light-source substrate is put,
wherein a part of the first chassis being parallel to the edge surface of the light guide plate and a part of the third chassis being parallel to the edge surface of the light guide plate are hooked by a fitting structure, with the part of the third chassis covering the part of the first chassis.

2. The surface light-emitting device of claim 1,
wherein the fitting structure comprises a first claw and a second claw,
the part of the first chassis on which the light-source substrate is put includes the first claw projecting toward an outside of the surface light-emitting device,
the part of the third chassis covering the part of the first chassis includes the second claw projecting toward an inside of the surface light-emitting device to fit with the first claw, and
the first chassis and the third chassis are fixed together by fitting the first claw and the second claw together.

3. The surface light-emitting device of claim 1,
wherein the protrusion of the first chassis is an embossed protrusion.

4. The surface light-emitting device of claim 1,
wherein the second chassis includes a side wall extending along a direction of the movement of the first chassis, the side wall including a second protrusion projecting toward an outside of the surface light-emitting device to fit with the first chassis so as to restrict a movement of the first chassis going away from the lower surface of the light guide plate before the movement of the first chassis along the lower surface of the light guide plate.

5. The surface light-emitting device of claim 1,
wherein the first chassis is formed to be detached from the surface light-emitting device together with the light-source substrate as one body in response to a movement of the first chassis going along the lower surface of the light guide plate and then going away from the lower surface of the light guide plate.

6. A surface light-emitting device comprising:
a light guide plate for emitting two-dimensionally-distributed light, the light guide plate including an upper surface and a lower surface facing each other and further including a notch;
a reflection sheet arranged on the lower surface of the light guide plate and including a notch;
a point light source for emitting light, arranged so as to make the light enter an edge surface of the light guide plate;
a light-source substrate including surfaces facing each other, the point light source being arranged on one of the surfaces;
a first chassis covering and extending along the other of the surfaces of the light-source substrate and the lower surface of the light guide plate, the light-source substrate being fixed on the first chassis, the first chassis including a protrusion projecting toward the lower surface of the light guide plate to be engaged with the notch of the light guide plate and the notch of the reflection sheet such that the light guide plate and the reflection sheet are pushed by the protrusion and are moved together with the first chassis in response to a movement of the first chassis along the lower surface of the light guide plate;

a second chassis including a light-emitting aperture for passing through the two-dimensionally-distributed light, and covering a part of the first chassis on which the light-source substrate is put;

wherein a part of the first chassis is parallel to the edge surface of the light guide plate and a part of the second chassis is parallel to the edge surface of the light guide plate are hooked by a fitting structure, with the part of the second chassis covering the part of the first chassis; and a liquid crystal panel put on the second chassis.

7. The surface light-emitting device of claim 6, wherein the fitting structure comprises a first claw and a second claw, the part of the first chassis on which the light-source substrate is put includes the first claw projecting toward an outside of the surface light-emitting device, the part of the second chassis covering the part of the first chassis includes the second claw projecting toward an inside of the surface light-emitting device to fit with the first claw, and the first chassis and the second chassis are fixed together by fitting the first claw and the second claw together.

8. The surface light-emitting device of claim 6, wherein the protrusion of the first chassis is an embossed protrusion.

9. The surface light-emitting device of claim 6, wherein the second chassis includes a side wall extending along a direction of the movement of the first chassis, the side wall including a second protrusion projecting toward an outside of the surface light-emitting device to fit with the first chassis so as to restrict a movement of the first chassis going away from the lower surface of the light guide plate before the movement of the first chassis along the lower surface of the light guide plate.

10. The surface light-emitting device of claim 6, wherein the first chassis is formed to be detached from the surface light-emitting device together with the light-source substrate as one body in response to a movement of the first chassis going along the lower surface of the light guide plate and then going away from the lower surface of the light guide plate.

* * * * *